(12) United States Patent
Karlsson

(10) Patent No.: US 7,002,509 B2
(45) Date of Patent: Feb. 21, 2006

(54) METHOD AND SYSTEM FOR EMITTER IDENTIFICATION USING TRANSMISSION SIGNATURES

(75) Inventor: Lars Karlsson, Santa Clara, CA (US)

(73) Assignee: Networkfab Corporation, Santa Clara, CA (US)

( * ) Notice: Subject to any disclaimer, the term of this patent is extended or adjusted under 35 U.S.C. 154(b) by 12 days.

(21) Appl. No.: 10/785,360

(22) Filed: Feb. 23, 2004

(65) Prior Publication Data

US 2004/0166818 A1     Aug. 26, 2004

Related U.S. Application Data

(60) Provisional application No. 60/449,313, filed on Feb. 24, 2003.

(51) Int. Cl.
    G01S 7/292      (2006.01)
(52) U.S. Cl. .................. 342/90; 342/192; 342/196; 342/13
(58) Field of Classification Search .............. 342/90, 342/192–196, 13
    See application file for complete search history.

(56) References Cited

U.S. PATENT DOCUMENTS

| | | | | |
|---|---|---|---|---|
| 4,484,193 A | * | 11/1984 | Bellew | 342/98 |
| 4,490,718 A | * | 12/1984 | Opitz et al. | 342/192 |
| 4,670,753 A | * | 6/1987 | Vacanti | 342/90 |
| 4,992,797 A | * | 2/1991 | Gjessing et al. | 342/192 |
| 5,068,664 A | * | 11/1991 | Appriou et al. | 342/90 |
| 5,376,940 A | * | 12/1994 | Abatzoglou | 342/192 |
| 5,402,131 A | * | 3/1995 | Pierce | 342/194 |
| 5,481,269 A | * | 1/1996 | Imhoff et al. | 342/90 |
| 5,867,118 A | * | 2/1999 | McCoy et al. | 342/90 |
| 6,222,481 B1 | * | 4/2001 | Abrahamson et al. | 342/90 |
| 6,801,155 B1 | * | 10/2004 | Jahangir et al. | 342/90 |
| 2002/0030623 A1 | * | 3/2002 | Arikan et al. | 342/195 |

* cited by examiner

Primary Examiner—John B. Sotomayor
(74) Attorney, Agent, or Firm—Steins & Associates, P.C.

(57) ABSTRACT

A Method and System for Emitter Identification Using Transmission Signatures is disclosed. Also disclosed is a system that is able to take in the undemodulated IF of the receiver and perform identification algorithms on that data. The system is further able to perform these functions in real-time and present the operator with an intelligent evaluation as to the identification of an emitter, or the presence of a new emitter. Still further, the system is capable of being fully automated to reduce the processing time to react to the results of the emitter identification. Furthermore, the present invention can feasibly remotely control the emitter identification system over a network and collect the same information from similar systems. In this way, a far more efficient System can be achieved wherein emitters can be determined, tracked, or monitored more quickly from a centralized command facility.

11 Claims, 4 Drawing Sheets

METHOD AND SYSTEM FOR EMITTER IDENTIFICATION USING TRANSMISSION SIGNATURES

This application is filed within one year of, and claims priority to Provisional Application Ser. No. 60/449,313, filed Feb. 24, 2003.

BACKGROUND OF THE INVENTION

1. Field of the Invention

This invention relates generally to Electronic Transmission Systems and, more specifically, to a Method and System for Emitter Identification Using Transmission Signatures.

2. Description of Related Art

Wireless communications involves the use of emitters (transmitters, transceivers, etc.) to transmit their signals electromagnetically. From a signal intelligence point of view, there are obvious advantages in being able to uniquely identify one emitter from the next. In the past, the methods that were employed to do this would identify each emitter by observing certain output signal characteristics. Prior art methods utilized time-domain based observations, or "RF fingerprints", to differentiate one emitter from the next. These methods are not extremely accurate and have certain limitations.

What is needed therefore in the communications industry is an improved method and technique that identifies emitters more accurately than is normally done today. The invention described herein provides such an improved method, through the utilization of frequency-domain based observations, as opposed to the previous time-domain based methods. The ability to detect, store, compare, and analyze these frequency-domain based observations, or "transmission signatures", for the purposes of emitter identification is the subject of this disclosure.

Each electronic emitter has electronic components called oscillators which are used to generate the various emitter's output frequencies. These oscillators inherently have very unique emission profiles in terms of subcarriers (intentional and non-intentional) and ramp up times, among others. The differences between emitters' oscillators arise due to fabrication, tuning, unit assembly, temperature, physical layout, manufacturing tolerances, and supporting component tolerances.

At the start of each transmission, an emitter's oscillators must output very specific frequencies in order to achieve the desired output frequency. As the oscillators are energized, they typically take several milliseconds to lock into their correct frequencies. In addition, their unique harmonics will interact with each other over this "key up" time period. This frequency-based profile over time of the way in which the oscillators key up to their final frequencies is what is referred to herein as the transmitter's "transmission signature". It is this transmission signature that is detected and analyzed (uniquely) by this invention so that each emitter can be identified when its signals are received.

In conclusion, insofar as the inventor is aware, no invention formerly developed provides this unique method to identify emitters by their transmission signatures.

SUMMARY OF THE INVENTION

In light of the aforementioned problems associated with the prior method and systems, it is an object of the present invention to provide a Method and System for Emitter Identification Using Transmission Signatures. The preferred system should be able to take in the undemodulated IF of the receiver and perform identification algorithms on that data. Such a frequency-based technique from the undemodulated IF is inherently more accurate due to the fact that there is unfiltered information that can be characterized and used for identification purposes that is not available in the prior art method. Furthermore, the preferred system must be able to perform these functions in real-time and present the operator with an intelligent evaluation as to the identification of an emitter, or the presence of a new emitter. It is a further object that this system is capable of being fully automated which would reduce the processing time to react to the results of the emitter identification. It is still even further an object that an alternative embodiment of the present invention is to feasibly remote control the emitter identification system over a network and collect the same information from similar systems. In this way, a far more efficient System can be achieved in which emitters can be determined, tracked, or monitored more quickly from a centralized command facility.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System for Emitter Identification Using Transmission Signatures.

Figure 1:
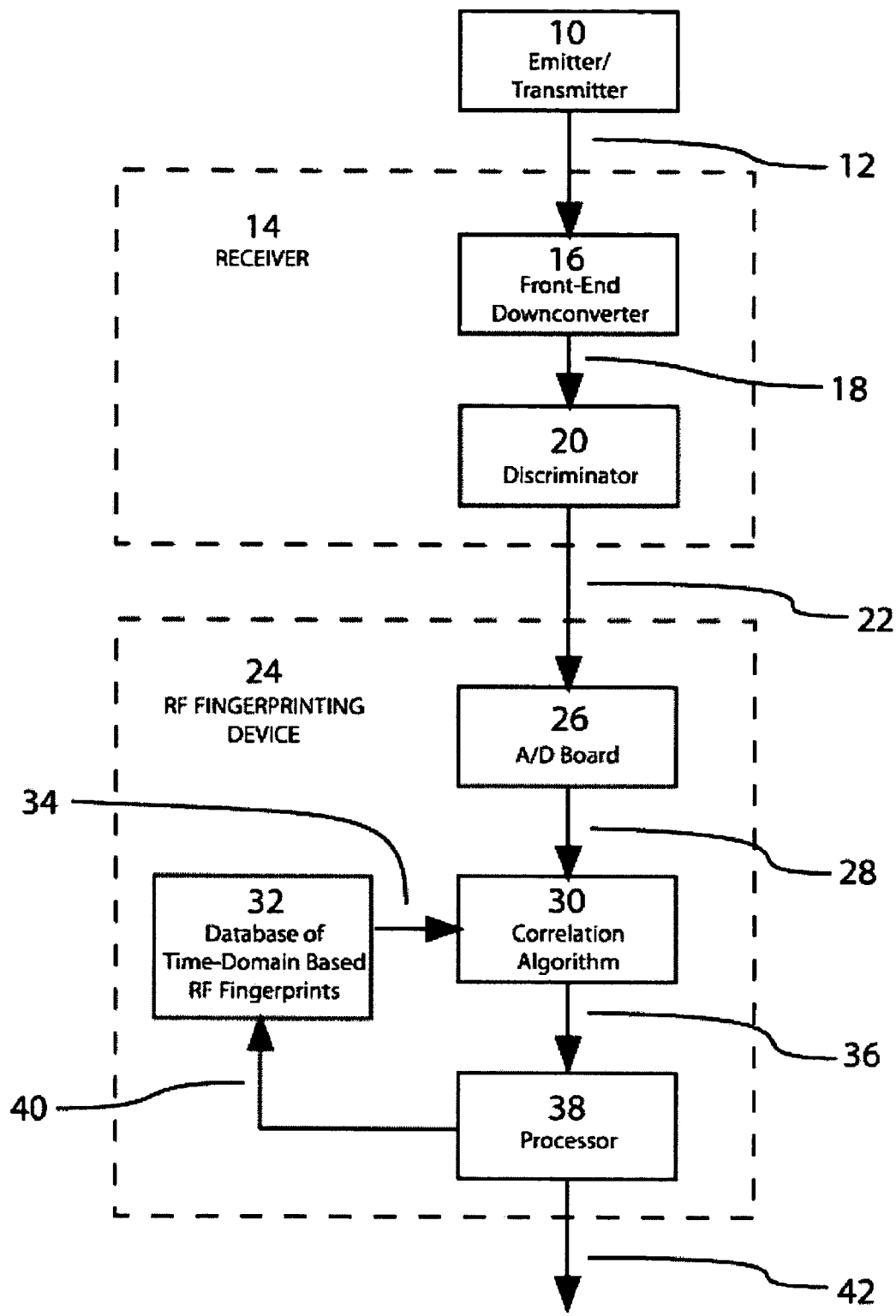
FIG. 1 is a drawing of the prior art method of emitter identification that utilizes a time-domain based analysis of an emitter's output signals.

The present invention can best be understood by initial consideration of FIG. 1. FIG. 1 is a drawing of the prior art method of emitter identification that utilizes a time-domain based analysis of an emitter's output signals. The technique of radio fingerprinting was developed in the 1940's and 1950's and has not undergone significant improvement over the years. There have been varying applications for the technique, but the fundamental concept of how radio fingerprinting works has not itself changed.

This prior art technique involves capturing an emitter's signal characteristics such as turn-on transients, turn-off transients, and final resting frequency. These characteristics were measured over the key up time of several milliseconds (after which, an emitter's final output frequency stabilizes) and then stored for analysis. The digitized information is evaluated by a computer with some correlation algorithm. The captured fingerprint is thus compared to a database of known time-based fingerprints for matching.

This prior art system was patented in U.S. Pat. No. 5,005,210 by Phillip J. Ferrell. In this patent, the emitters are identified by measuring the signal phase of the turn-on transient from the discriminator with respect to a predetermined frequency.

What is needed therefore in order to improve the performance of these emitter identification systems is (1) An enhanced technique to collect additional information about an emitter (transmission signatures), and thus increase the accuracy of the identification process; and (2) An enhanced method to evaluate the transmission signature data with a specialized database matching technique. These two aspects are the subject of the present invention.

The emitter/transmitter 10 outputs an RF signal 12 that is captured by a receiver 14. The receiver first processes the captured signal through a front-end downconverter module 16. The output is the Intermediate Frequency (IF) which is still an analog signal, and it contains all the captured information about the signal transmission 12. This IF frequency is downconverted and filtered several more times (in a heterodyne system) until it is fed into a discriminator module 20 which outputs an analog output voltage 22. This analog output of the discriminator is proportional to the frequency offset from the predetermined tuned frequency of the RF signal 12.

The RF Fingerprinting device 24 takes the discriminator's analog output 22 and performs an analog-to-digital conversion with an A/D board 26. The discriminator's digitized output 28 taken over the key up period is the RF fingerprint. This RF fingerprint is then fed to a correlation algorithm 30. This correlation algorithm compares the RF fingerprint with a database 32 of other time-based RF fingerprints profiles 34. The matching results 36 are then fed to a processor 38 for evaluation. If there is a good match, then the processor outputs the result of the RF fingerprint matching 42. If there is not a match, then the processor sends a feedback signal 40 to the RF fingerprint database 32 instructing the database to send a new profile 34 to the correlation algorithm for evaluation. This iterative process continues until a best match is obtained.

It should be noted, that in these prior art systems, sometimes manual visual comparisons of the RF fingerprints are performed due to the uncertainties of the automated iterative correlation process. An enhanced implementation of the correlation process through a unique "classification system" is presented below in this disclosure.

Figure 2:
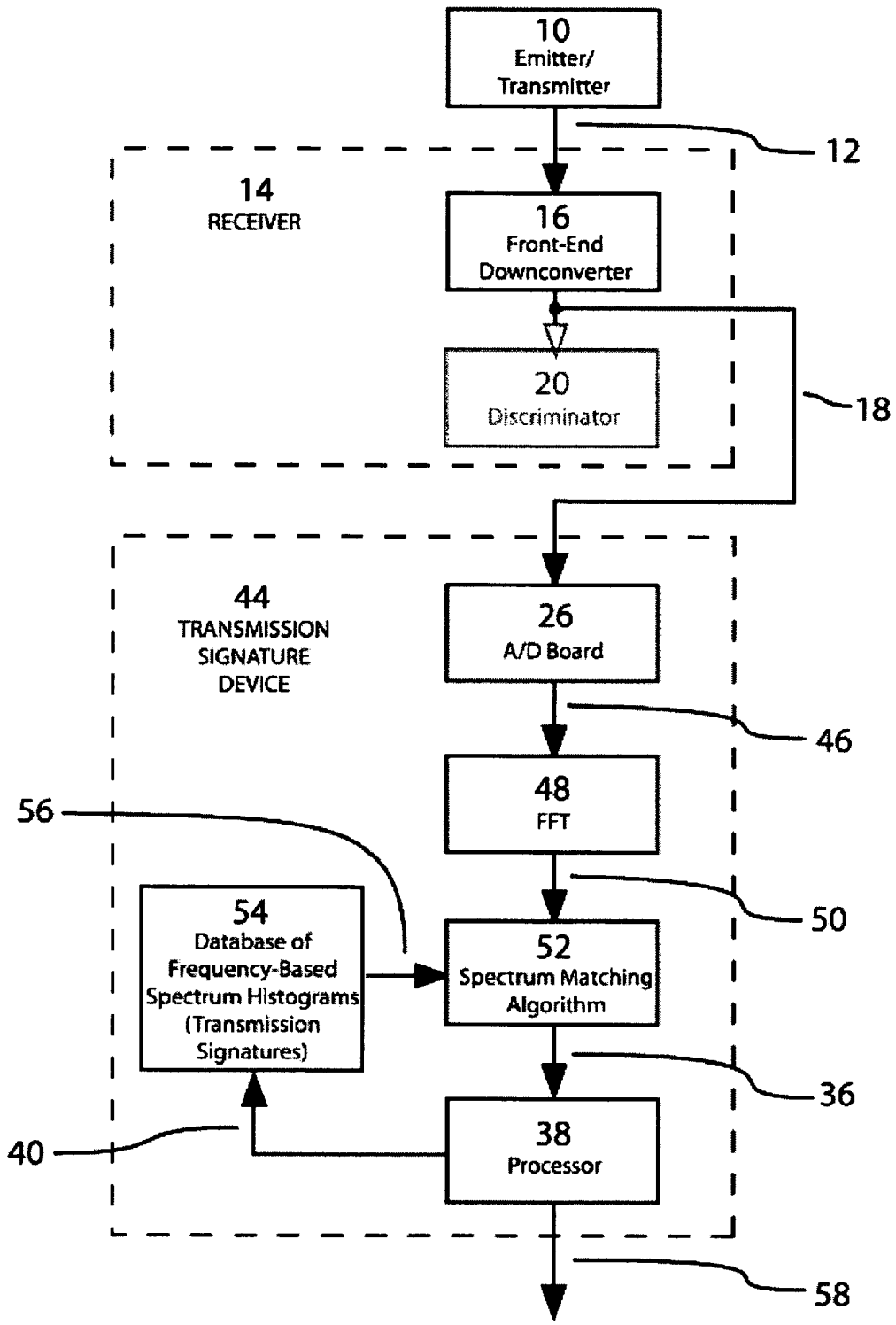
FIG. 2 is a drawing of how the system and method of the present invention identifies emitters through their transmission signatures.

FIG. 2 is a drawing of how approach that the method and system of the present invention identifies emitters through their transmission signatures. The invention uses frequency-domain based analysis that yields far more information than the former time-domain method. Thus, the new method is inherently more accurate than the former method.

In this drawing the first IF of the receiver 14 is used, instead of the discriminator output 22. This IF signal 18 is taken directly from the receiver and fed into the A/D board 26 of the transmission signature device 44. An FFT 48 is performed on the digitized IF spectrum 46 and the result 50 fed to the spectrum matching algorithm 52. The frequency domain spectrum 50 over time is known as the transmission signature.

The technique of this invention involves the combination of comparing frequency-based transmission signatures, with a classification system to process this data. In the end, an operator is presented with the results.

An operator first connects the transmission signature device 44 to the first stage analog IF output of a receiver 14. Then the operator uses the receiver 14 to capture a signal from an emitter. The IF signals are fed into the transmission signature device 44 and the processing occurs automatically.

The transmission signature of the captured signal is created per the description above, using an 8,192 point (or higher) FFT over a time period of several milliseconds. Then it is classified and assigned to its own bin with transmission signatures of similar type. "Similar type" refers to transmission signatures that have their final resting frequency on the same point in the 8,192 (or higher) array of data. If no such bin exists with similar profile, then a new classification is created and the signature is "placed" into this new bin. It is then assumed that this is a new emitter never before captured by the System.

The processor 38 coordinates the entire emitter classification and identification process as well as the output display to the operator. The processor 38 can output the result of frequency-based transmission signature matching in a variety of ways. After the processor completes comparing a transmission signature with other signatures in its bin, the display will show a "matching value" with each signature in the database 54.

This matching value is a metric that can be used by the operator for manual evaluation as to whether or not the signal from an emitter is actually from a known emitter. Alternatively, the processor 38 can be programmed to output the best match according to threshold criteria and automatically present the operator with an evaluation. As mentioned, if the transmission signature is new, or the matching values presented are very low, then it can be determined by the operator that the emitter in question has not been received before by the System. In such a case, that transmission signature is stored in database 54 as a newly detected emitter.

Figure 3:
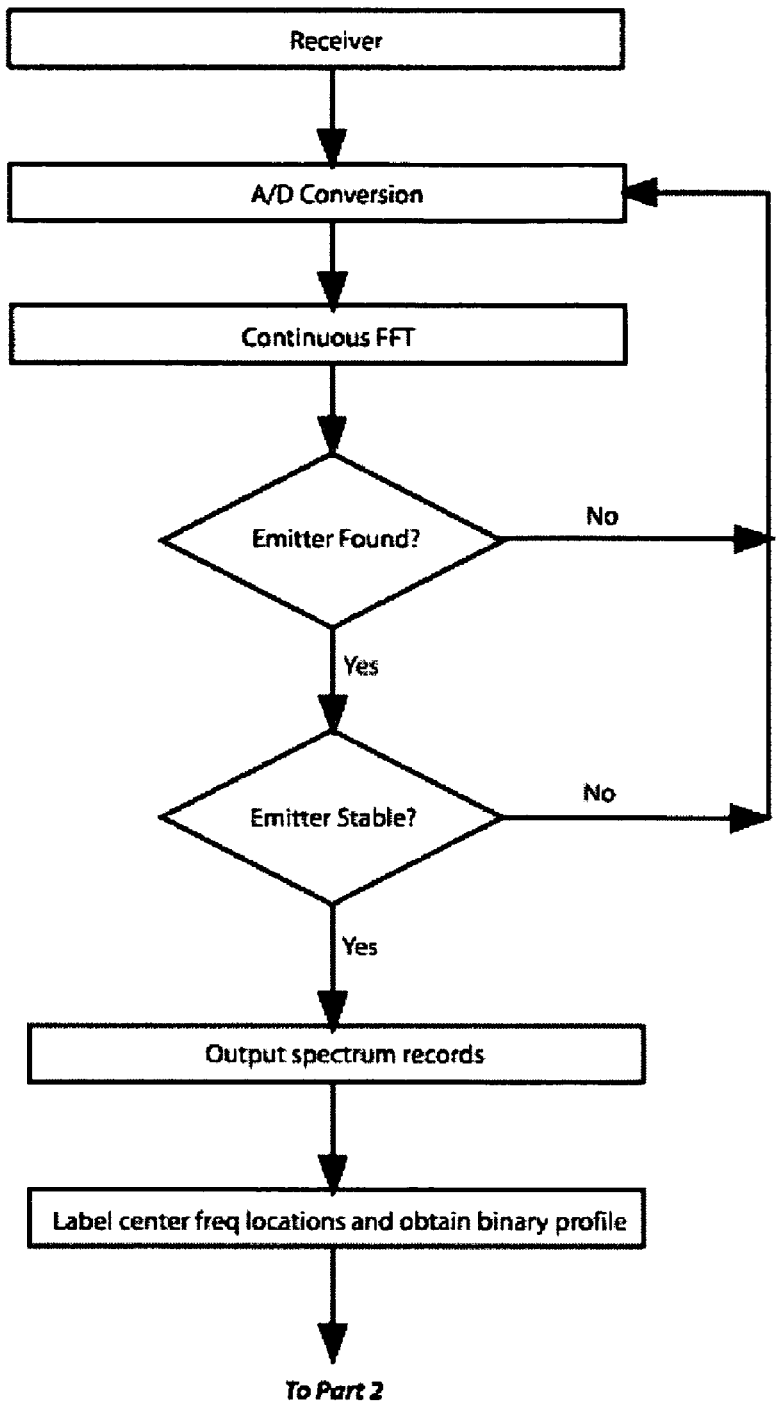
FIG. 3 is part 1 of a top-level flowchart of the "spectrum matching system"
Figure 4:
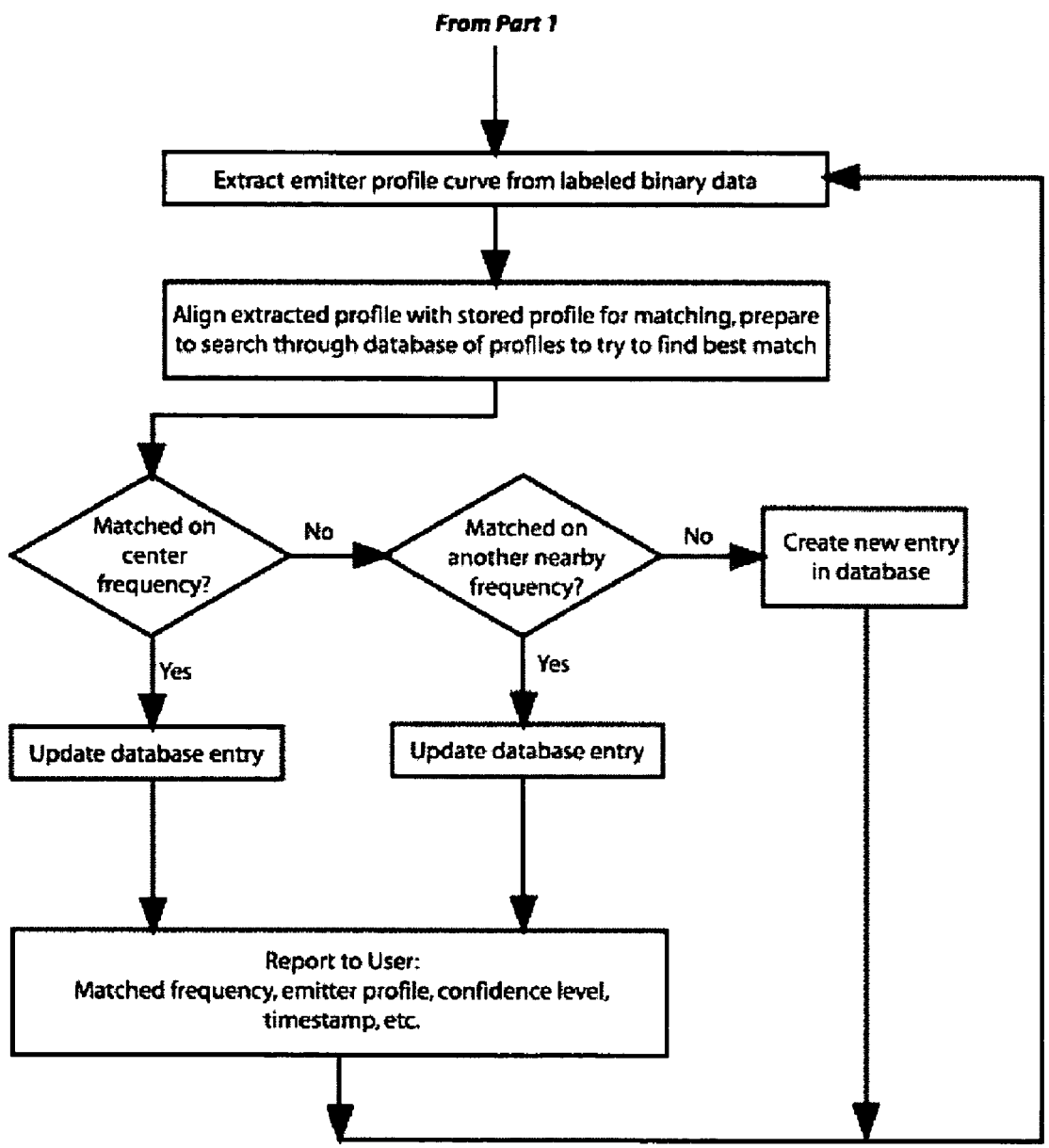
FIG. 4 is a top-level flowchart of the spectrum matching system's decision process of how the emitter profiles are evaluated, stored, and matched.

FIGS. 3 and 4 are a top-level flowchart of the "spectrum matching algorithm"; These figures show the internal course of the algorithm's operations from the receiver's output through the production of binary profiles for evaluation (which is subsequently described by the flowchart of FIG. 4).

The spectrum matching system 52 outputs a matching result 36 to the processor 38. A classification system is employed in the system 52 which confines the scope of the matching process so that a result can be obtained more efficiently and thus feasibly in real-time. This classification process groups each transmission signature of like-type into its own record or "bin." Thus, the matching process first only considers transmission signatures from the same bin.

The matching result 36 is then fed to a processor 38 for evaluation and stored. The processor then sends a feedback signal 40 to the transmission signature database 54 instructing the database to send the next profile 56 from the same bin, to the spectrum matching algorithm 52 for matching evaluation. This iterative process continues until all transmission signatures from the same bin have been compared to the newly captured transmission signature. The processor then outputs the results of the matching process with associated confidence levels (a metric that "rates" the matching process).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

DIAGRAM REFERENCE NUMERALS

10 Emitter/Transmitter
12 RF (Radio Frequency) Signals
14 Receiver
16 Front-End Downconverter
18 IF (Intermediate Frequency) Signals
20 Discriminator
22 Analog Output Voltage of the Discriminator
24 RF Fingerprinting Device
26 A/D (Analog to Digital) Conversion Board
28 Digitized Output of the Discriminator
30 Correlation Algorithm
32 Database of Time Based RF Fingerprints
34 Time-Based RF Fingerprint Profile
36 Matching Result
38 Processor
40 Feedback—Add New Signal or Advance Next Entry
42 Result of Time Based RF Fingerprint Matching
44 Transmission Signature Device
46 Digitized IF Spectrum
48 FFT (Fast Fourier Transform)
50 Frequency Domain Spectrum
52 Spectrum Matching Algorithm
54 Database of Frequency Based Spectrum Histograms—Transmission Signatures
56 Spectrum Histogram
58 Result of Frequency Based Transmission Signature Matching

What is claimed is:

1. A method for identifying an electronic transmitter device by its transmission characteristics, the method comprising the steps of:
   an identifier system receiving an incident transmission emitted by a transmitter device, said transmission defined by frequency characteristics including a final resting frequency;
   said identifier system generating a unique signature responsive to said characteristics of said transmission;
   said identifier system classifying said signature responsive to said final resting frequency; and
   said identifier system comparing said signature with a set of other transmission signatures.

2. The method of claim 1, wherein said generating comprises generating said unique signature by applying a Fourier Transform to said received transmission.

3. The method of claim 2, wherein said receiving comprises receiving a transmission defined by at least a keyup frequency characteristic in addition to said final resting frequency.

4. The method of claim 3, further comprising:
   a first generating step prior to said generating step, said first generating step comprising said identifier system generating an intermediate frequency sample responsive to said received incident transmission, said intermediate frequency sample defined by said frequency characteristics; and
   a second generating step prior to said generating step, said second generating step comprising said identifier system generating a digital intermediate frequency sample based on said intermediate frequency sample.

5. The method of claim 4, wherein said generating step is responsive to said frequency characteristics of said digital intermediate frequency sample.

6. The method of claim 5, wherein said comparing step comprises said identifier system comparing said transmission signature with a set of other transmission signatures, all of said other transmission signatures defined by a final resting frequency classification substantially the same as said transmission signature of said received transmission.

7. The method of claim 6, further comprising a second comparing step, said second comparing step being executed by said identifier system when said set of other transmission signatures fails to comprise a transmission signature defined by a final resting frequency classification substantially the same as said transmission signature of said received transmission, said second comparing step comprising said identifier system comparing said received transmission signature to one or more sets of other transmission signatures defined by final resting frequency classifications not substantially the same as said transmission signature of said received transmission.

8. The method of claim 7, further comprising a data repository addition step after said second comparing when said set of other transmission signatures fails to comprise a transmission signature substantially the same as said transmission signature of said received transmission, said data repository addition step comprising said identifier system adding said transmission signature of said received transmission to a data repository.

9. The method of claim 8, wherein said data repository addition step comprises said identifier system adding said transmission signature of said received transmission to a set of said data repository defined by said final resting frequency of said received transmission.

10. A transmitted signal classification system for classifying incident radio frequency transmission signals, where said incident radio frequency transmission signals emanate from electronic systems not associated with said transmitted signal classification system, comprising:
   a receiver for receiving a said incident signal;
   a transmission signature device, said transmission signature device comprising:
      an analog-to-digital converter device for converting said incident signal into digital data format;
      a fourier transform generator for generating a transmission signature of said received signal by applying a fourier transform to said digital data;
      a classification system for associating a classification to said transmission signature according to the final resting frequency of said incident signal, said associated classification being unrelated to any radar cross-section; and
      a matching system for matching said transmission signature of said transmission with a set of transmission signatures stored in a data repository associated with said matching system.

11. The system of claim 1, wherein said matching system matches said transmission signature with a set of transmission signatures stored in said data repository, said set comprising transmission signatures having classifications substantially similar to said classification of said received transmission.

* * * * *